(12) United States Patent
Hwang et al.

(10) Patent No.: US 10,239,484 B2
(45) Date of Patent: Mar. 26, 2019

(54) ACTIVE HOOD APPARATUS FOR VEHICLE

(71) Applicant: Hyundai Motor Company, Seoul (KR)

(72) Inventors: In Hwang, Hwaseong-si (KR); SoYeon Park, Seoul (KR); ByungJoo Lee, Seoul (KR); Kiwon Kim, Hwaseong-si (KR); Byounghaan Choi, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 14 days.

(21) Appl. No.: 15/486,142

(22) Filed: Apr. 12, 2017

(65) Prior Publication Data
US 2018/0141516 A1   May 24, 2018

(30) Foreign Application Priority Data

Nov. 23, 2016   (KR) .......................... 10-2016-0156878

(51) Int. Cl.
| | |
|---|---|
| *E05D 3/12* | (2006.01) |
| *E05D 3/14* | (2006.01) |
| *E05D 7/00* | (2006.01) |
| *B60R 21/38* | (2011.01) |
| *B62D 25/12* | (2006.01) |

(52) U.S. Cl.
CPC .............. *B60R 21/38* (2013.01); *B62D 25/12* (2013.01); *E05D 3/125* (2013.01); *E05D 3/145* (2013.01); *E05D 7/00* (2013.01); *B60Y 2400/404* (2013.01); *E05Y 2900/536* (2013.01)

(58) Field of Classification Search
CPC ......... B60R 21/38; B62D 25/12; E05D 3/145; E05D 7/00; E05Y 2900/536; B60Y 2400/404
See application file for complete search history.

(56) References Cited

U.S. PATENT DOCUMENTS

| | | | |
|---|---|---|---|
| 6,257,657 B1 * | 7/2001 | Sasaki ................... | B60R 21/013 180/69.21 |
| 7,232,178 B2 * | 6/2007 | Neal ....................... | B60R 21/38 180/274 |
| 8,534,410 B2 * | 9/2013 | Nakaura ................. | B60R 21/38 180/274 |
| 9,010,478 B2 * | 4/2015 | Fritzon ................ | B62D 25/105 180/274 |
| 9,308,886 B1 | 4/2016 | Hwang | |
| (Continued) | | | |

FOREIGN PATENT DOCUMENTS

KR            101640550 B1      7/2016

*Primary Examiner* — Drew J Brown
(74) *Attorney, Agent, or Firm* — Slater Matsil, LLP

(57) ABSTRACT

An active hood apparatus for a vehicle includes a hood configured to cover an engine compartment of vehicle, and at least one hinge device configured to rotatably connect a rear end portion of the hood to a vehicle body. The hinge device includes a fixing bracket fixed to the vehicle body. A rotation bracket is provided such that a rear end thereof is rotatably connected to a rear end portion of the fixing bracket. A hood bracket is fixed to an inner surface of the hood and fixed to the rotation bracket by a first breaking pin. A connecting link provided such that opposite ends thereof are rotatably connected to a rear end portion of the hood bracket and a middle portion of the rotation bracket respectively. An actuator is configured to push up the connecting link in the event that a collision occurs.

18 Claims, 13 Drawing Sheets

(56) References Cited

U.S. PATENT DOCUMENTS

| | | | |
|---|---|---|---|
| 9,988,011 B2 * | 6/2018 | Battermann | B60R 21/36 |
| 2006/0175844 A1 * | 8/2006 | Neal | B60R 21/38 292/340 |
| 2007/0102219 A1 * | 5/2007 | Park | B60R 21/38 180/274 |
| 2008/0156556 A1 * | 7/2008 | Takahashi | B60R 21/38 180/69.21 |
| 2010/0244484 A1 * | 9/2010 | Nakaura | B60R 21/38 296/187.04 |

* cited by examiner

ACTIVE HOOD APPARATUS FOR VEHICLE

CROSS-REFERENCE TO RELATED APPLICATIONS

This application claims the benefit of Korean Patent Application No. 10-2016-0156878, filed on Nov. 23, 2016 in the Korean Intellectual Property Office, the disclosure of which is incorporated herein by reference.

TECHNICAL FIELD

Embodiments of the present disclosure relate to an active hood apparatus for a vehicle.

BACKGROUND

A hood of vehicle is installed to be openable in the upper portion of an engine compartment. The hood covers the upper portion of the engine compartment to prevent the engine noise and as needed, the hood opens the upper portion of the engine compartment for the maintenance and the inspection.

Recently, the vehicle has employed an active hood apparatus configured to protect a pedestrian from the impact by raising the hood upon collision with the pedestrian. When the collision with a pedestrian is detected, the active hood apparatus secures a buffer space between the engine compartment and the hood by raising the hood to reduce the injury of the pedestrian by preventing the secondary impact between the pedestrian and a component in the engine compartment inside of the hood.

In a conventional manner, the active hood apparatus raises the rear end portion of the hood by using a lifter installed in the side of a hood hinge device. However, since only the rear end of the hood is raised according to this method, there is a limit to enhancing the impact reduction effect of the pedestrian. In addition, because the hood is raised upward from the engine compartment when the vehicle collides with a pedestrian, there is a limit to softening the impact applied to the pedestrian.

SUMMARY

Embodiments of the present disclosure relate to an active hood apparatus for a vehicle capable of increasing an effect for softening an impact applied to a pedestrian by raising the hood to the rear upper side.

Embodiments of the present disclosure provide an active hood apparatus capable of improving an effect for softening an impact applied to a pedestrian by raising a hood to the rear upper side.

Other embodiments of the present disclosure provide an active hood apparatus capable of improving an effect for softening an impact by simultaneously raising a front end and a rear end of a hood to the rear upper side.

Additional aspects of the present disclosure will be set forth in part in the description which follows and, in part, will be obvious from the description, or may be learned by practice of the present disclosure.

In accordance with one aspect of the present disclosure, an active hood apparatus for vehicle includes a hood configured to cover an engine compartment of vehicle, and at least one hinge device configured to rotatably connect a rear end portion of the hood to a vehicle body. The hinge device includes a fixing bracket fixed to the vehicle body. A rotation bracket is provided such that a rear end thereof is rotatably connected to a rear end portion of the fixing bracket. A hood bracket is fixed to an inner surface of the hood and fixed to the rotation bracket by a first breaking pin. A connecting link is provided such that opposite ends thereof are rotatably connected to a rear end portion of the hood bracket and a middle portion of the rotation bracket respectively. In actuator is configured to push up the connecting link with a force that is sufficient to break the first breaking pin and configured to raise the hood bracket to a rear upper side by separating the hood bracket from the rotation bracket when a collision occurs.

The hinge device may further include a second breaking pin configured to fix the connecting link to the rotation bracket, and the actuator may push up the connecting link with a force that is sufficient to break the first breaking pin and the second breaking pin when a collision occurs.

The hinge device may further include a descent limitation protrusion provided in the fixing bracket and a locking member installed in the rotation bracket and configured to limit the descent of the rotation bracket by being locked to the descent limitation protrusion when the hood bracket is separated from the rotation bracket and the rotation bracket is raised.

The locking member may be rotatably installed in the rotation bracket, wherein a rotation of the locking member is limited by being locked to the hood bracket or the connecting link before the hood bracket is raised, and after the hood bracket is raised, the locking member is rotated by an elastic member and then locked to the descent limitation protrusion.

The active hood apparatus for vehicle may further include a striker installed in the front end portion of the hood, and a hood latch installed in the vehicle body for bonding of the striker.

The striker may include an upper locking portion normally coupled to the hood latch and a lower locking portion disposed in the front side of the upper locking portion in a state of being continuously connected to the upper locking portion, placed in a position lower height than the upper locking portion, and configured to raise the front end portion of the hood by being coupled to the hood latch as the hood is moved to the rear upper side.

In accordance with another aspect of the present disclosure, an active hood apparatus for vehicle includes a hood configured to cover an engine compartment of vehicle and at least one hinge device configured to rotatably connect a rear end portion of the hood to a vehicle body. The hinge device includes a fixing bracket fixed to the vehicle body. A hood bracket is fixed to an inner surface of the hood. A rear link portion is provided such that opposite ends thereof are rotatably connected to the fixing bracket and the hood bracket, respectively and configured to be maintained in a folded state since a joint connecting portion provided in the middle of the rear link portion is normally moved to the front side. A front link portion is installed in the more front side than the rear link portion, provided such that opposite ends thereof are rotatably connected to the fixing bracket and the hood bracket, respectively, and configured to be maintained in a folded state since a joint connecting portion provided in the middle of the front link portion is normally moved to the front side. A middle link is provided such that opposite ends thereof are rotatably connected to the joint connecting portion of the rear link portion and the joint connecting portion of the front link portion, respectively. In actuator is configured to raise the hood bracket to a rear upper side by allowing the rear link portion and the front link portion to be unfolded by pushing up the lower side the front link portion when a collision occurs.

The rear link portion includes a first lower link rotatably connected to the fixing bracket by a first lower pin, a first upper link rotatably connected to the hood bracket by a first upper pin, and a first middle pin configured to connect the first lower link to the first upper link to be foldable.

The front link portion includes a second lower link rotatably connected to the fixing bracket by a second lower pin, a second upper link rotatably connected to the hood bracket by a second upper pin, and a second middle pin configured to connect the second lower link to the second upper link to be foldable.

The hinge device may further include a constraining member rotatably installed in the first lower link to restrict the first lower link in a folded state, and provided with a constraining groove opened in one end portion in a circumferential direction. A constraining pin can be installed in the fixing bracket and normally inserted into the constraining groove of the constraining member to maintain binding of the constraining member. A constraining protrusion can be provided in the fixing bracket to lock a front end of the second lower link to normally restrict the second lower link in a folded state.

The actuator may raise the second lower link to allow the constraint by the constraining member and the constraining protrusion to be released and simultaneously to allow the front link portion and the rear link portion to be unfolded when a collision occurs.

The constraining member includes a folding limitation protrusion configured to limit a folding in a state in which the rear link portion is unfolded, and the first upper link includes a locking protrusion locked to the folding limitation protrusion in the state in which the rear link portion is unfolded.

A length of the second upper link may be longer than a length of the first upper link.

A distance between the first upper pin and the second upper pin may be shorter than a distance between the first lower pin and the second lower pin.

BRIEF DESCRIPTION OF THE DRAWINGS

These and/or other aspects of the disclosure will become apparent and more readily appreciated from the following description of embodiments, taken in conjunction with the accompanying drawings of which:

FIG. 2 illustrates a state before the hood is raised and FIG. 3 illustrates a state after the hood is raised;

FIG. 6 illustrates a state before operation and FIG. 7 illustrates a state in which the hood is raised to the rear upper side after the operation;

FIG. 10 illustrates a state before an operation, FIG. 11 illustrates an early state of the operation, and FIG. 12 illustrates a state in which the hood is raised to the rear upper side after operation.

DETAILED DESCRIPTION OF ILLUSTRATIVE EMBODIMENTS

Figure 1:
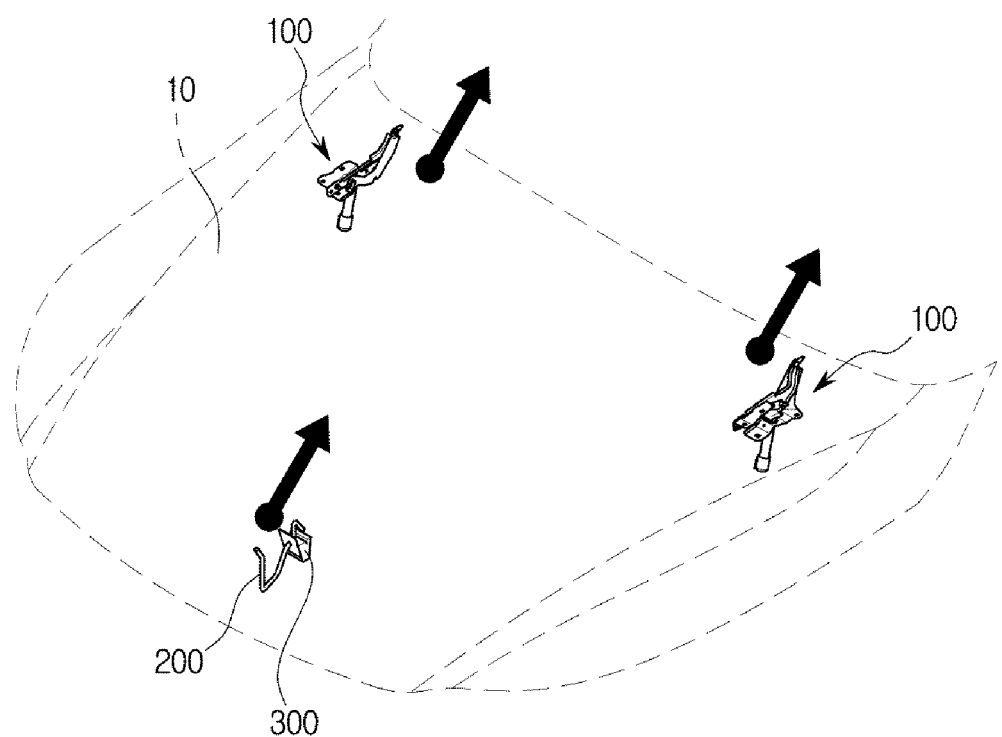
FIG. 1 is a perspective view of an active hood apparatus for vehicle in accordance with a first embodiment of the present disclosure.

Example embodiments will now be described more fully with reference to the accompanying drawings, in which example embodiments are shown. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. In the drawings, it is possible to omit the parts of the drawings that are not related to the description and the sizes of components may be exaggerated for clarity.

Figure 2:
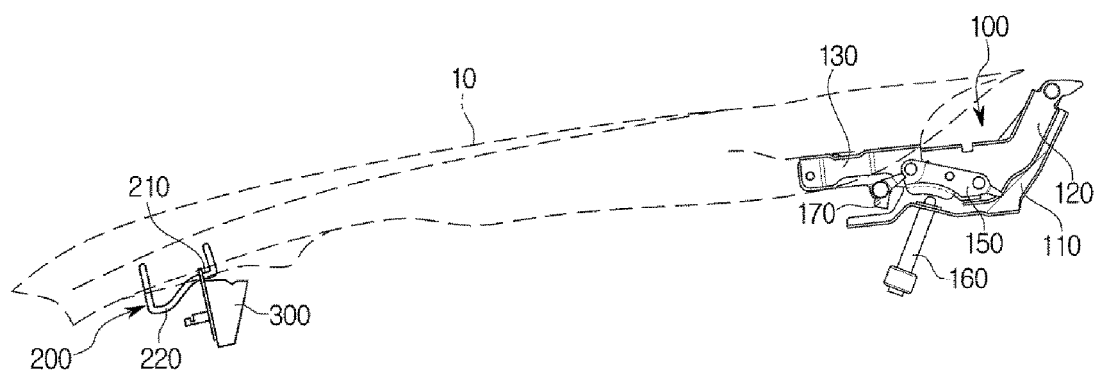
FIGS. 2 and 3 are side views of the active hood apparatus for vehicle in accordance with the first embodiment, particularly
Figure 3:
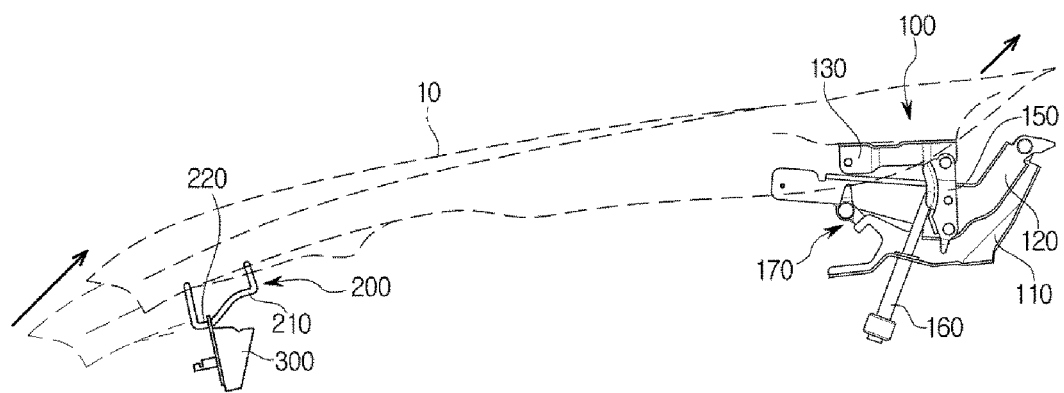

FIG. 1 is a perspective view of an active hood apparatus for vehicle in accordance with a first embodiment of the present disclosure, and FIGS. 2 and 3 are side views of the active hood apparatus for vehicle in accordance with the first embodiment, particularly FIG. 2 illustrates a state before the hood is raised and FIG. 3 illustrates a state after the hood is raised.

Referring to FIGS. 1 to 3, an active hood apparatus may include a hood 10 covering an upper portion of an engine compartment of vehicle, a hinge device 100 rotatably connecting a rear end portion of the hood 10 to a vehicle body to open or close the hood 10 and when a frontal collision occurs, raising the rear end portion of the hood 10 to the rear upper side, a striker 200 installed in the center of the inner side of the front end portion of the hood 10 to lock the hood 10, and a hood latch 30o installed in the vehicle body to bind or release a binding of the striker 200. The hinge device 100 may be respectively installed in opposite sides of the rear end portion of the hood 10 to stably open or close the hood 10.

Figure 4:
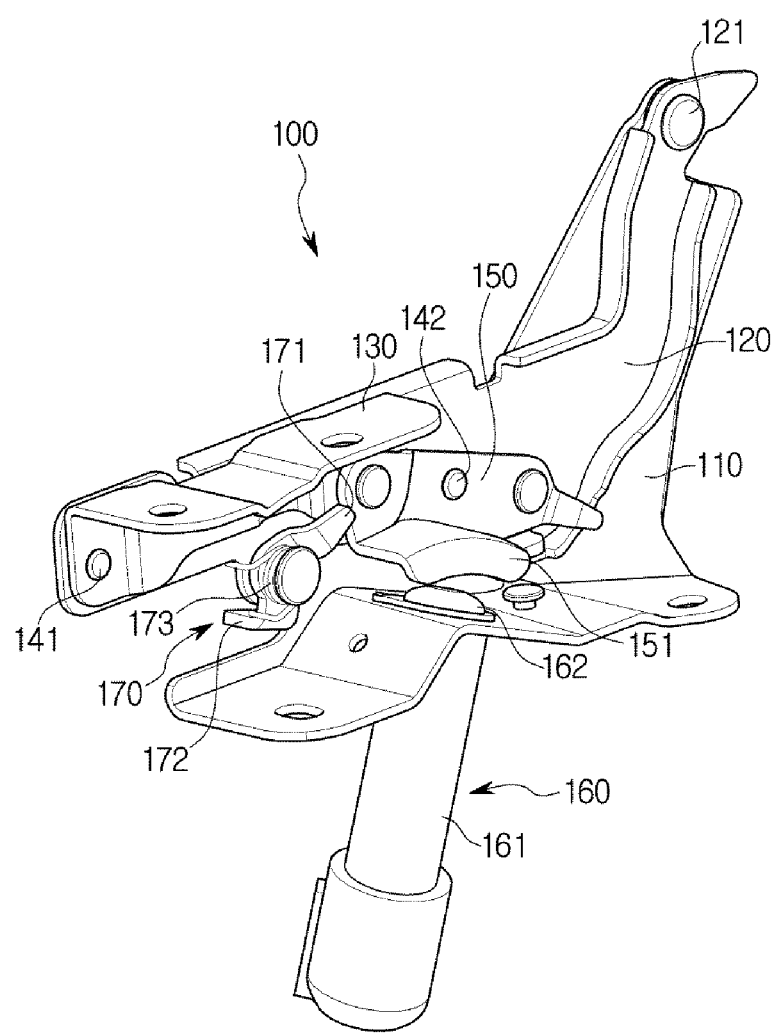
FIGS. 4 and 5 are perspective views illustrating a hinge device of the active hood apparatus seen from different angles in accordance with the first embodiment.
Figure 5:
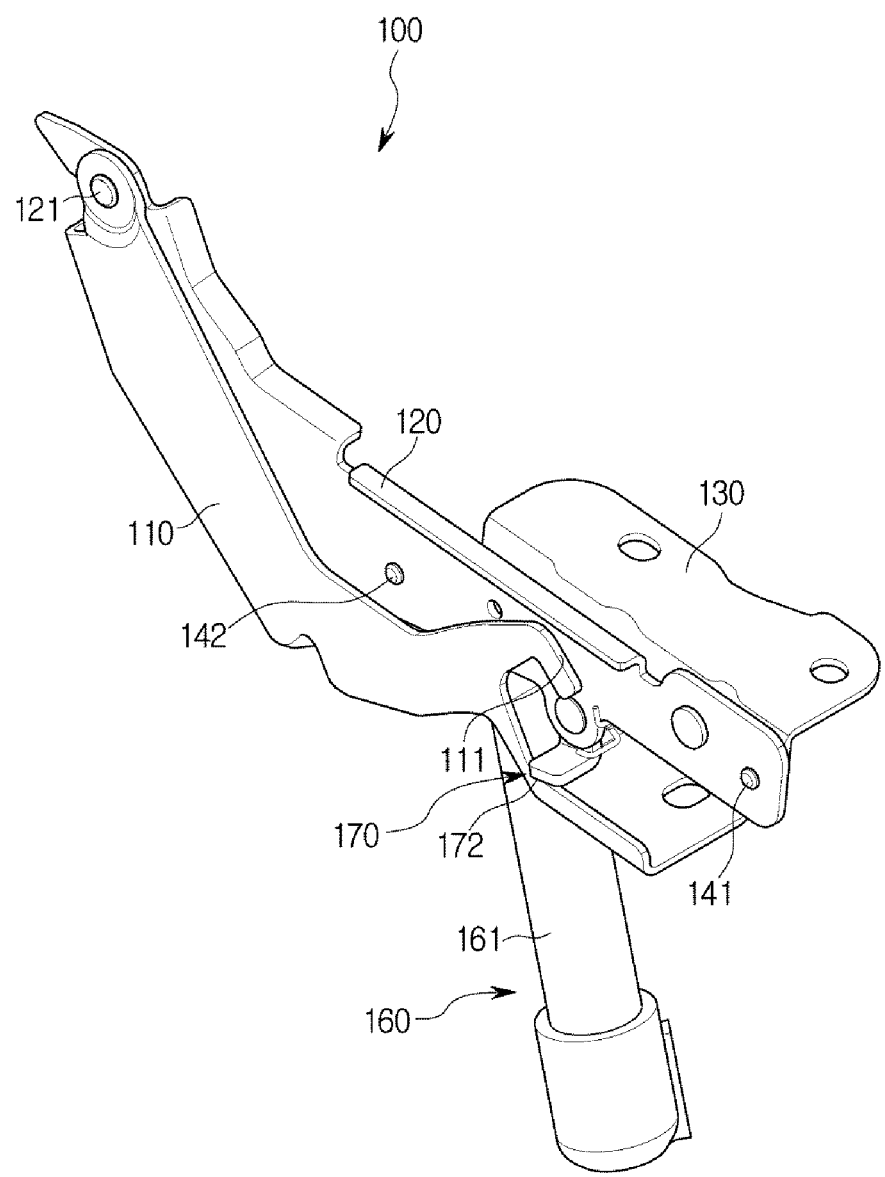
Figure 6:
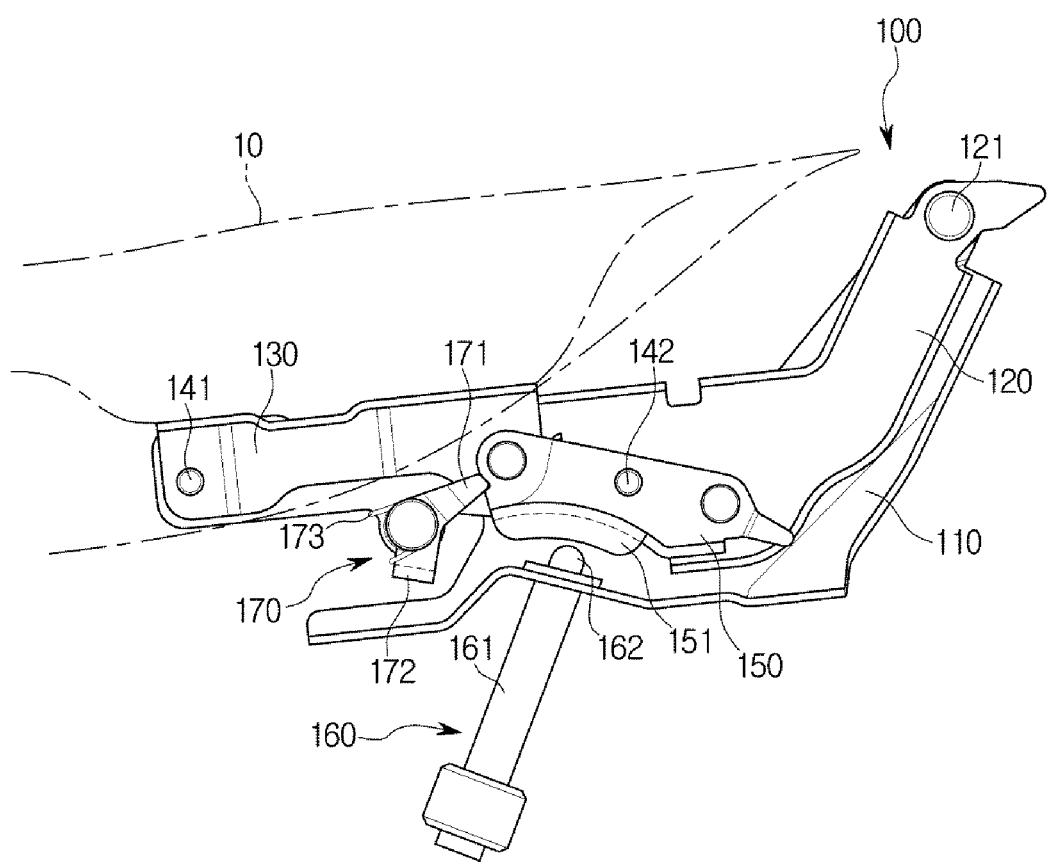
FIGS. 6 and 7 are side views of the hinge device in accordance with the first embodiment, particularly.
Figure 7:
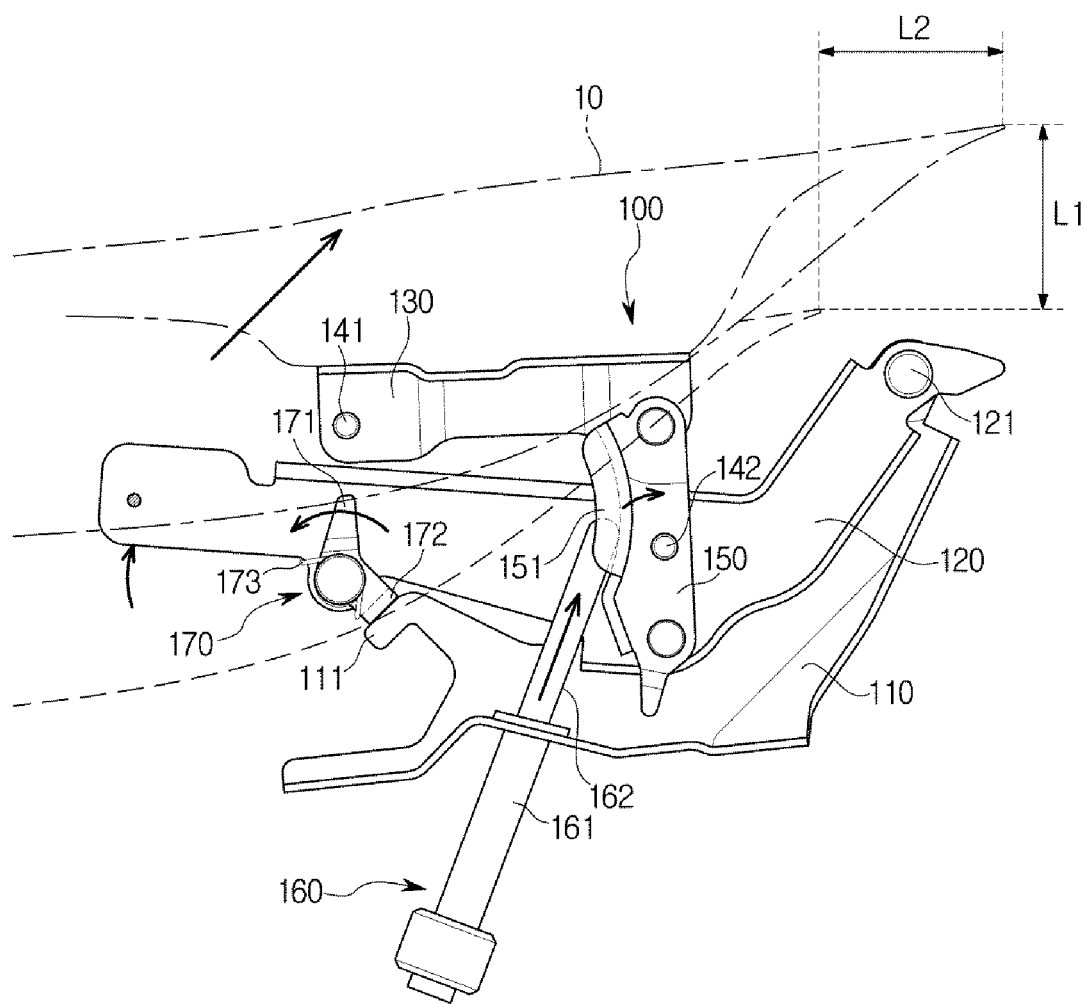

FIGS. 4 and 5 are perspective views illustrating a hinge device of the active hood apparatus seen from different angles in accordance with the first embodiment, FIGS. 6 and 7 are side views of the hinge device in accordance with the first embodiment, particularly, FIG. 6 illustrates a state before operation and FIG. 7 illustrates a state in which the hood is raised to the rear upper side after the operation.

Referring to FIGS. 4 to 7, the hinge device 100 may include a fixing bracket no fixed to the vehicle body, a rotation bracket 120 whose a rear end is rotatably connected to the rear end portion of the fixing bracket no, a hood bracket 130 fixed at an inner surface of the hood 10 and fixed to the rotation bracket 120 by a first breaking pin 141, a connecting link 150 whose opposite ends are rotatably connected to the rear end portion of the hood bracket 130 and a middle portion of the rotation bracket 120, respectively, and an actuator 160 configured to raise the hood 10 to the rear upper side by pushing up the connecting link iso.

Referring to FIG. 6, the fixing bracket no and the rotation bracket 120 may have a shape extended in the front and rear direction, and the rear end of the rotation bracket 120 may be rotatably connected to the rear end of the fixing bracket no. The hood bracket 130 may be normally fixed to the front end side of the rotation bracket 120 by the first breaking pin 141 and the connecting link 150 may be normally fixed to the rotation bracket 120 by a second breaking pin 142 while rotatably connecting the rear end of the hood bracket 130 to the middle portion of the rotation bracket 120.

Therefore, the hood 10 may be opened or closed by a rotation of the rotation bracket 120 since the hood bracket 130 and the connecting link 150 are normally fixed to the rotation bracket 120. That is, as illustrated in FIG. 6, when the hinge device 100 is folded (i.e., a state in which the rear end portion of the hood is not raised), the hood 10 may be opened or closed by being rotated with respect to a support shaft 121 of the rotation bracket 120.

As illustrated in FIG. 7, the actuator 160 may include an operator 161 fixed to the vehicle body and an elongation portion 162 elongated to the rear upper side from the operator 161 to push up the connecting link iso. The operator 161 may push up the elongation portion 162 while gun power embedded inside of the operator 161 is exploded. The actuator 160 may be obliquely installed so that the elongation portion 162 pushes up the connecting link 150 while the elongation portion 162 is elongated to the rear upper side.

The actuator 160 may push up the connecting link 150 with an intensity that is sufficient to break the first breaking pin 141 and the second breaking pin 142 at the same time when the collision of the vehicle occurs. Therefore, when the actuator 160 is operated, the actuator 160 may break the first breaking pin 141 and the second breaking pin 142 and rotate the connecting link 150 to the rear upper side, thereby raising the hood bracket 130, which is connected to the hood 10, to the rear upper side, as illustrated in FIG. 7.

In the description, the actuator 160 has been illustrated as an example, but the shape of the actuator 160 is not limited thereto. The actuator may use a method of elongating an elongation portion by using the magnetic force of the electromagnet.

The first breaking pin 141 and the second breaking pin 142 may be formed of a relatively soft material so that the first breaking pin 141 and the second breaking pin 142 normally fix the hood bracket 130 and the connecting link 150 to the rotation bracket 120, but when the actuator 160 is operated, the first breaking pin 141 and the second breaking pin 142 may be broken by a force of the actuator 160.

A case in which the hinge device 100 employs the first breaking pin 141 for fixing the hood bracket 130 and the second breaking pin 142 for fixing the connecting link 150 has been described as an example. Alternatively, the hood bracket 130 and the connecting link 150 may be fixed to the rotation bracket 120 by installing only the first breaking pin 141, and in this case, the second breaking pin 142 may be excluded.

As illustrated in FIGS. 4 to 7, the connecting link 150 may include an actuator support 151 supporting an upper end of the elongation portion 162 of the actuator 16o. Therefore, at the operation of the actuator 16o, the actuator 160 may stably push up the connecting link iso.

According to the first embodiment, the hinge device 100 may include a descent limitation protrusion 111 provided in the front side of the fixing bracket no and a locking member 170 locked to the descent limitation protrusion 111 to limit the descent of the rotation bracket 120, as illustrated in FIGS. 4, 5, and 7.

As illustrated in FIG. 7, the locking member 170 may limit the descent of the rotation bracket 120 such that when the hood bracket 130 is separated from the rotation bracket 120 and the rotation bracket 120 is raised, the descent limitation protrusion 111 of the fixing bracket no may be stopped by the locking member 170. That is, it may be possible to maintain a state in which the hood 10 is raised to the rear upper side by the operation of the actuator 160.

As illustrated in FIGS. 4, 5, and 7, the locking member 170 may be rotatably installed in the rotation bracket 120. A rotation of the locking member 170 may be restricted since a support 171 provided in one side of the locking member 170 is be locked to the hood bracket 130 or the connecting link 150 before the hood bracket 130 is raised. As illustrated in FIG. 7, when the lock of the support 171 is released after the hood bracket 130 is raised, a locking portion 172, which is provided in a side opposite to the support 171, may be locked to the descent limitation protrusion 111 while the locking member 170 is rotated by the elastic force of the elastic member 173. The elastic member 173 may be a torsion spring that is installed in the locking member 170 to apply a rotational force for rotating the locking member 170 in one direction.

Referring to FIGS. 2 and 3, the striker 200 may include an upper locking portion 210 normally coupled to the hood latch 300 and a lower locking portion 220 disposed in the front side of the upper locking portion 210 in a state of being continuously connected to the upper locking portion 210 and placed in a position lower height than the upper locking portion 210.

As illustrated in FIG. 2, as for the striker 200, the upper locking portion 210 may be coupled to the hood latch 300 when the actuator 160 of the hinge device 100 is not operated, i.e., the hood 10 is not raised. Therefore, the hood 10 may normally maintain a state in which the front end portion thereof is lowered.

In this state, when the hood 10 is raised to the rear upper side by the operation of the hinge device 100, the striker 200 may be moved to the rear side in a slide manner, while coupled to the hood latch 300, and then the lower locking portion 220 may be placed in the hood latch 300, as illustrated in FIG. 3. Accordingly, the front end portion of the hood 10 may be raised. Therefore, raising the front end of the hood 10 may be realized without installing an additional actuator in the side of the striker 200.

Next, an operation of the active hood apparatus will be described according to the first embodiment.

Referring to FIG. 2, according to the first embodiment, the active hood apparatus may normally maintain a state in which the hinge device 100 installed in the rear end portion of the hood 10 is folded. In addition, the striker 200 in the front end portion of the hood 10 may maintain a state in which the upper locking portion 210 is locked to the hood latch 300.

In this state, when a collision occurs in front of the vehicle, the actuator 160 of the hinge device 100 may be activated by a detection of the sensor. As illustrated in FIGS. 3 to 7, the actuator 160 may push up the connecting link 150 to the upper side while the elongation portion 162 is elongated, the connecting link 150 may be rotated and raised to the rear side while the first breaking pin 141 and the second breaking pin 142 are broken by the force of the actuator 16o, and then the hood bracket 130 separated from the rotation bracket 120 may be raised to the rear upper side.

When the actuator 160 is activated, as mentioned above, the rear end portion of the hood 10 may be raised by $L_1$ (approximately 60 mm) from the state illustrated in FIG. 6 to the state illustrated in FIG. 7, while being moved to the rear side by $L_2$. That is, the hood 10 may be raised to the rear upper side.

After the rotation bracket 120 is raised and the hood bracket 130 is raised, the locking member 170 may be locked to the descent limitation protrusion 111 to prevent the descent of the rotation bracket 120. Accordingly, it may be possible to maintain a state in which the hood 10 is raised to the rear upper side. Therefore, it may be possible to prevent a pedestrian from secondary hitting on the engine, after hitting on the hood 10, when the collision accident occurs.

When the rear end portion of the hood 10 is raised while being moved to the rear side, as illustrated in FIG. 3, the striker 200 in the front end portion of the hood 10 may be moved to the rear side and the lower locking portion 220 may be coupled to the hood latch 300. Therefore, the front end portion of the hood 10 may be also raised while being moved to the rear side.

As mentioned above, as for the active hood apparatus for vehicle according to the first embodiment, when the vehicle collides with a pedestrian, the front end and the rear end of the hood 10 may be simultaneously raised from the engine compartment to secure a buffer space so as to soften the impact. In addition, since the impact is softened by an operation in which the entire of the hood 10 is moved to the rear side, the reduction effect of the impact applied to the pedestrian may be improved.

Figure 8:
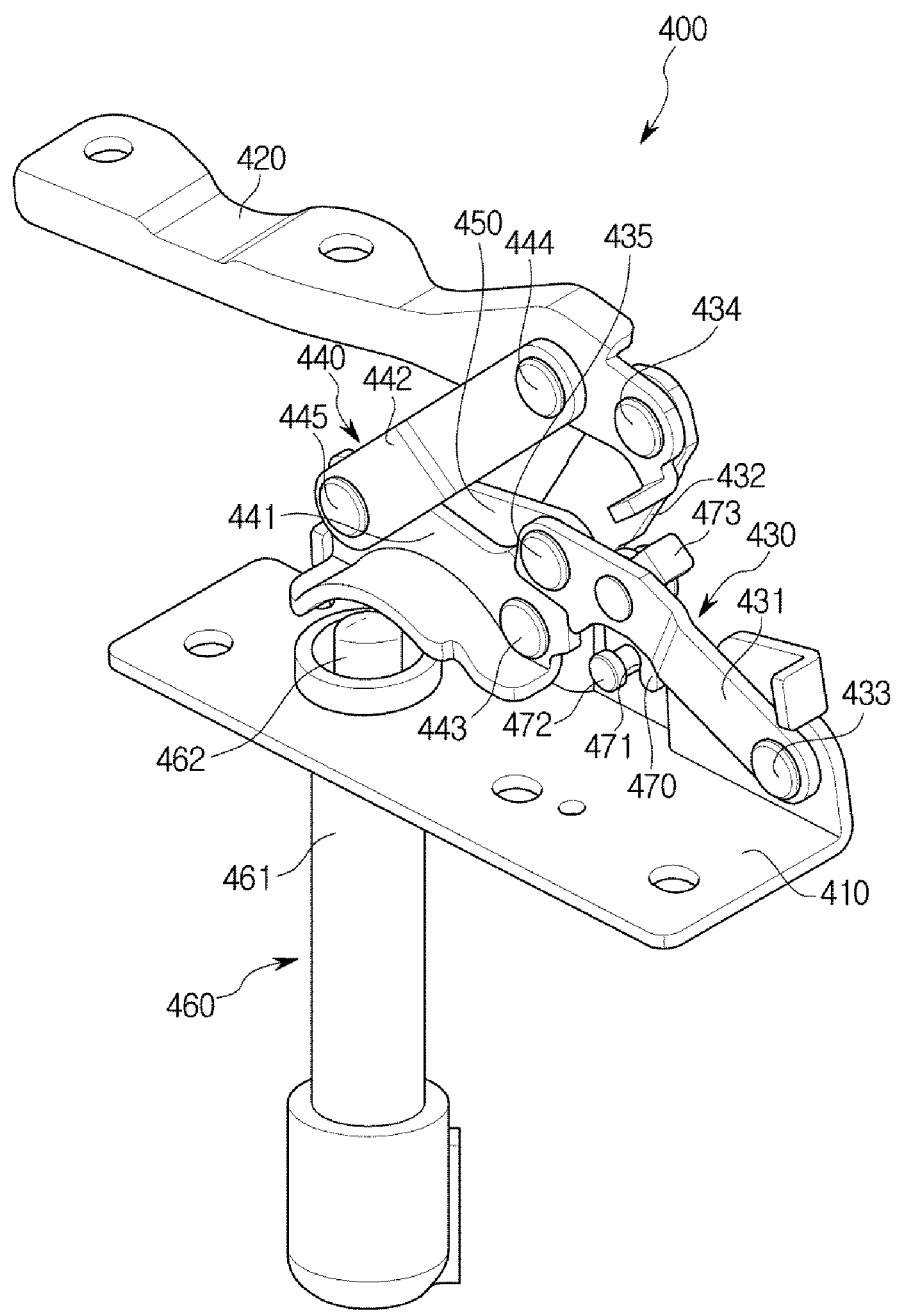
FIGS. 8 and 9 are perspective views of the hinge device of the active hood apparatus seen from different angles in accordance with the second embodiment.
Figure 9:
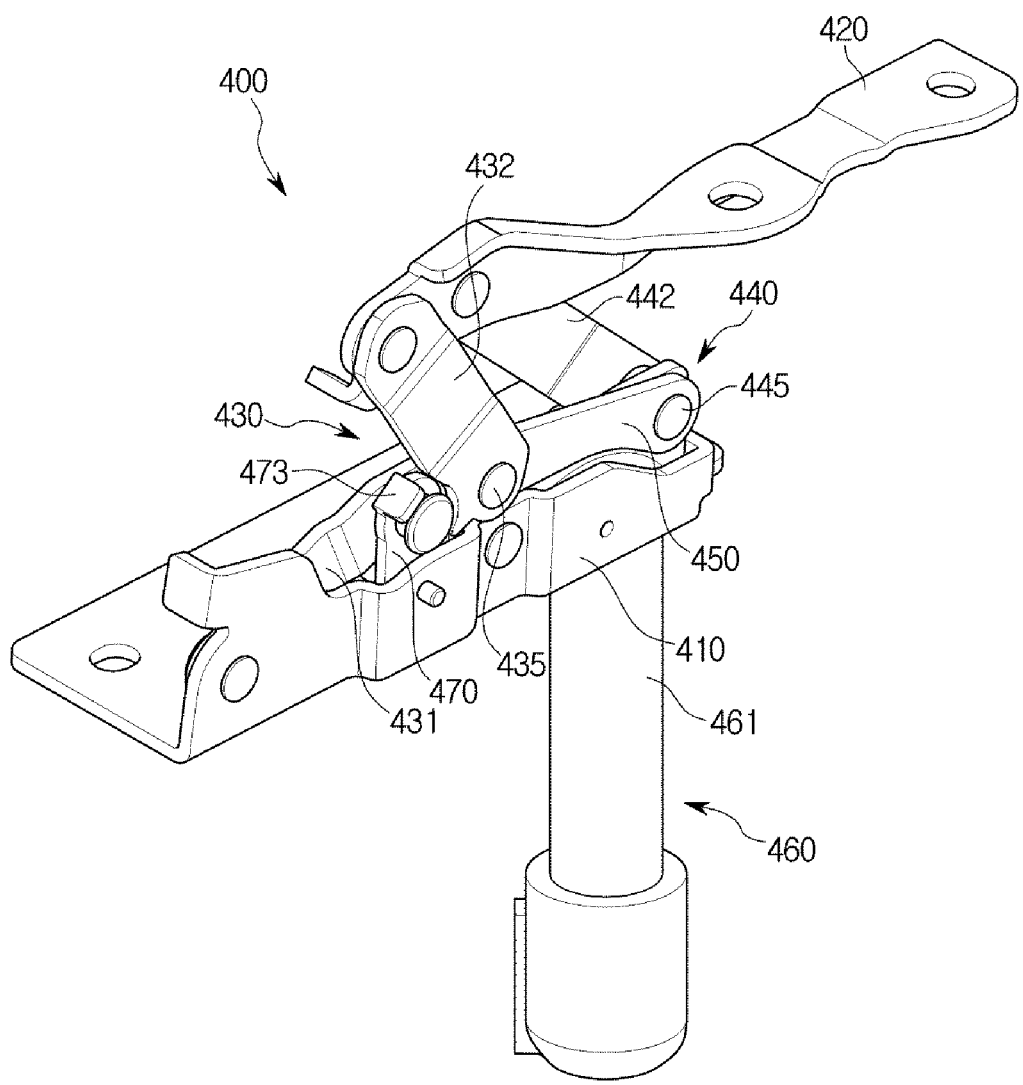

FIGS. 8 to 13 are views of a hinge device of an active hood apparatus in accordance with a second embodiment of the present disclosure. FIGS. 8 and 9 are perspective views of the hinge device of the active hood apparatus seen from different angles in accordance with the second embodiment.

Figure 10:
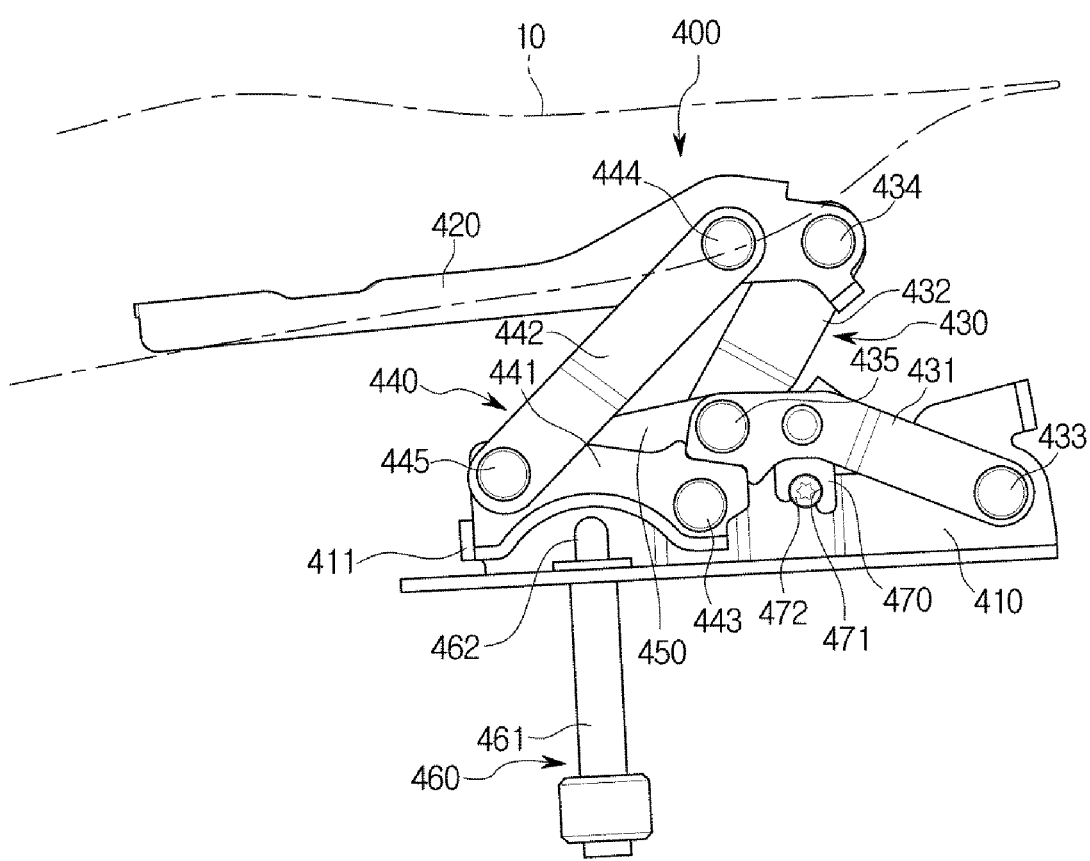
FIGS. 10 to 12 are side views of the hinge device in accordance with the second embodiment, particularly.
Figure 11:
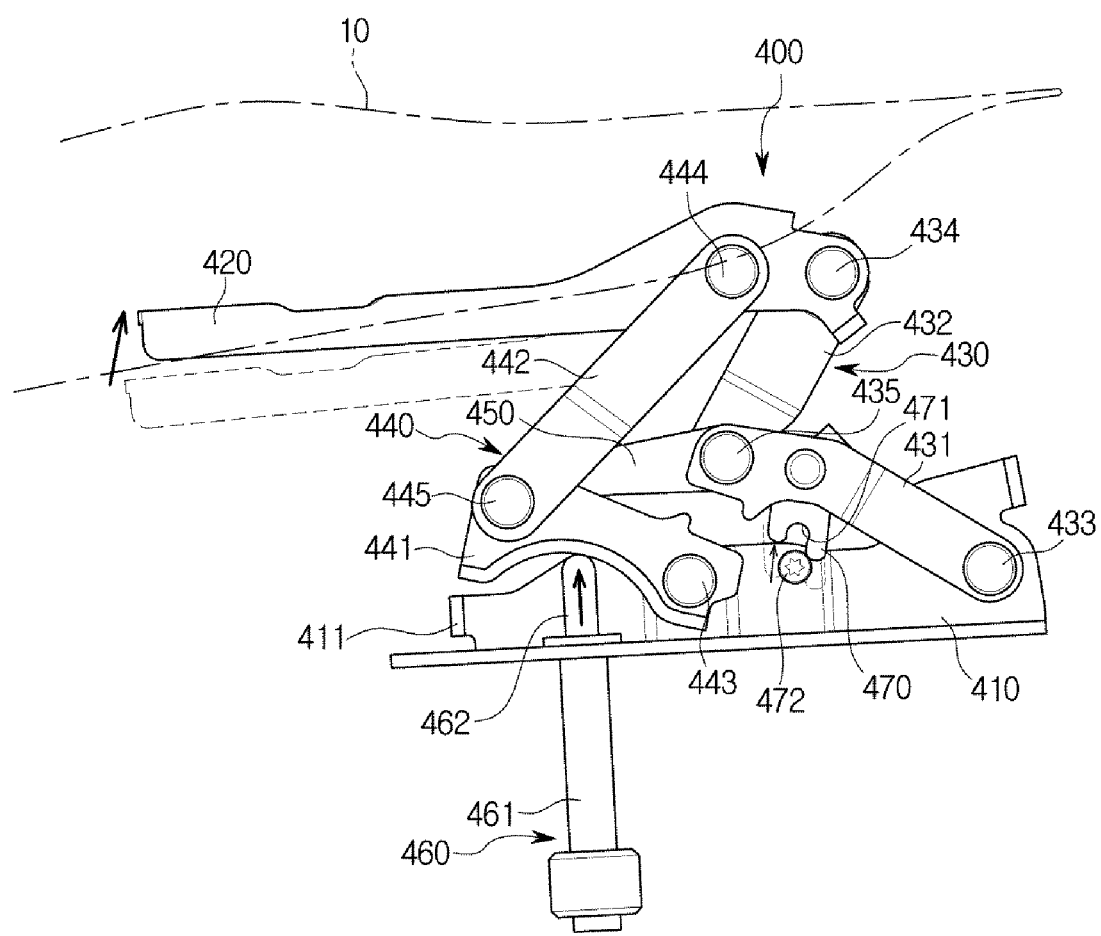
Figure 12:
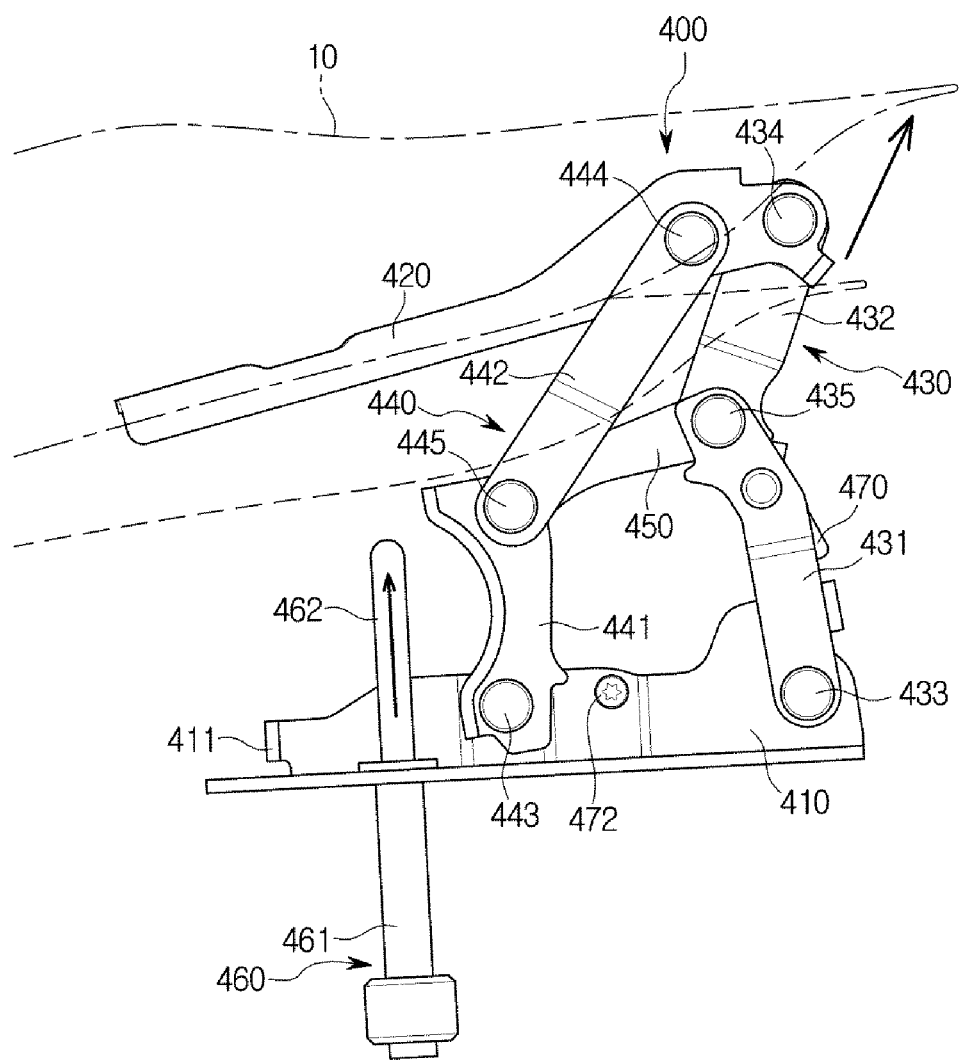
Figure 13:
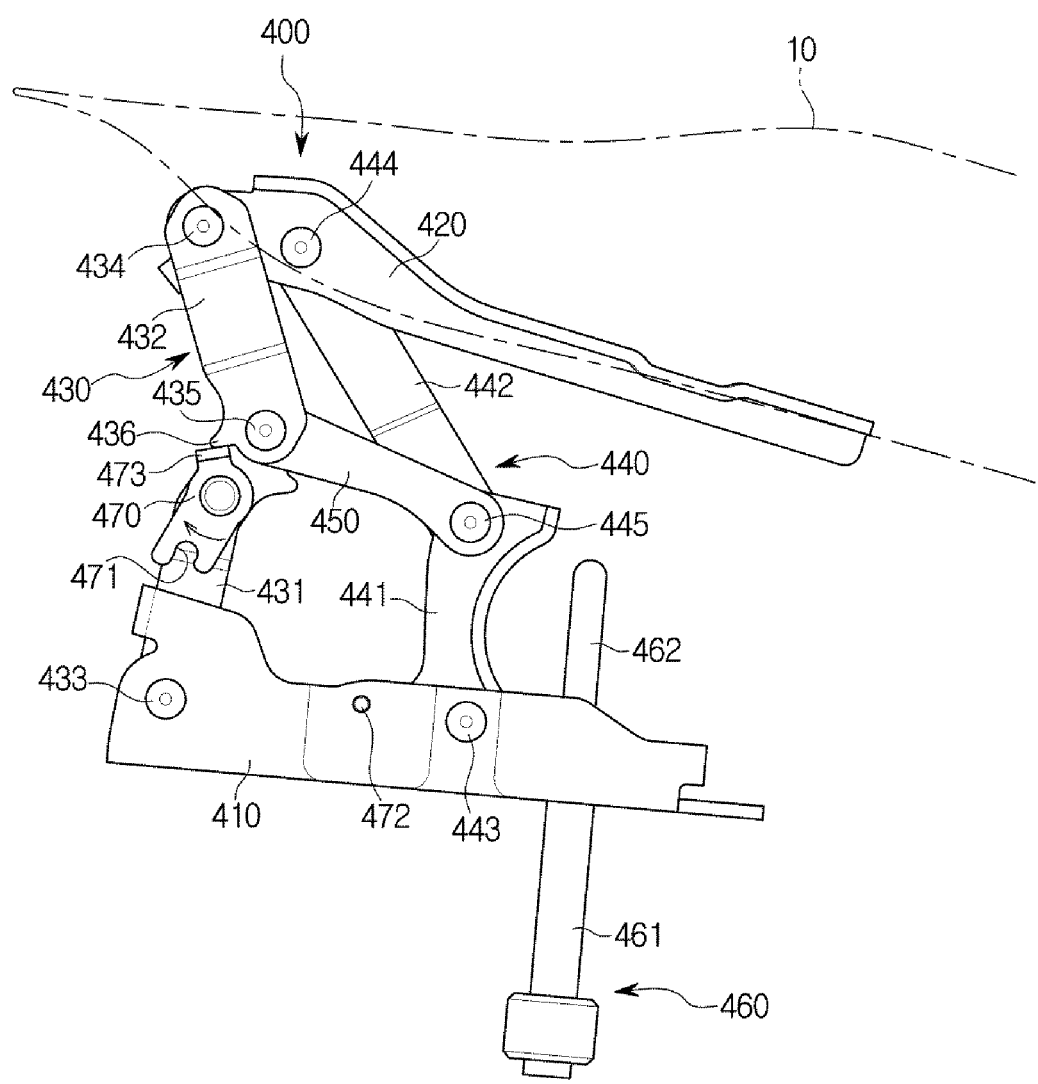
FIG. 13 is a view illustrating a state in which the hinge device is prevented from being folded after being unfolded, in accordance with the second embodiment.

FIGS. 10 to 12 are side views of the hinge device in accordance with the second embodiment, particularly, FIG. 10 illustrates a state before an operation, FIG. 11 illustrates an early state of the operation, and FIG. 12 illustrates a state in which the hood is raised to the rear upper side after operation. FIG. 13 is a view illustrating a state in which the hinge device is prevented from being folded after being unfolded, in accordance with the second embodiment.

Referring to FIGS. 8 to 12, according to the second embodiment, the hinge device 40o may include a fixing bracket 410 fixed to the vehicle body, a hood bracket 420 fixed to an inner surface of a rear end portion of a hood 10, a rear link portion 430, a front link portion 440, and a middle link portion 450 all of which are configured to connect the fixing bracket 410 to the hood bracket 420, and an actuator 460.

As illustrated in FIG. 10, the rear link portion 430 may be provided such that opposite ends thereof are rotatably connected to the fixing bracket 410 and the hood bracket 420, respectively. The rear link portion 430 may maintain a folded state in which a joint connecting portion provided in the middle thereof is normally moved to the front side.

The rear link portion 430 may include a first lower link 431 rotatably connected to the fixing bracket 410 by a first lower pin 433, a first upper link 432 rotatably connected to the hood bracket 420 by a first upper pin 434, and a first middle pin 435 configured to connect the first lower link 431 to the first upper link 432 to be foldable.

The front link portion 440 may be installed in the more front side than the rear link portion 430, and the front link portion 440 may be provided such that opposite ends thereof are rotatably connected to the fixing bracket 410 and the hood bracket 420, respectively. The front link portion 440 may maintain a folded state in which a joint connecting portion provided in the middle thereof is normally moved to the front side.

The front link portion 440 may include a second lower link 441 rotatably connected to the fixing bracket 410 by a second lower pin 443, a second upper link 442 rotatably connected to the hood bracket 420 by a second upper pin 444, and a second middle pin 445 configured to connect the second lower link 441 to the second upper link 442 to be foldable.

Opposite ends of the middle link portion 450 may be rotatably connected to the first middle pin 435 of the rear link portion 430 and the second middle pin 445 of the front link portion 440, respectively.

As illustrated in FIGS. 10 to 12, the actuator 460 may include an operator 461 fixed to the vehicle body in the lower side of the second lower link 441 and an elongation portion 462 configured to allow the rear link portion 430 and the front link portion 440 to be unfolded by pushing up the second lower link 441 while being elongated from the operator 461 to the upper side. The operator 461 may push up the elongation portion 462 by gun power that is embedded inside thereof and then exploded, in the same manner as illustrated in the first embodiment.

As illustrated in FIG. 10, according to the second embodiment, the hinge device 400 may include a constraining member 470 rotatably installed in the first lower link 431 to restrict the first lower link 431 in a folded state, and provided with a constraining groove 471 formed to be opened in one end portion in a circumferential direction, a constraining pin 472 installed in the fixing bracket 410 and normally inserted into the constraining groove 471 of the constraining member 470 to maintain binding of the constraining member 470, and a constraining protrusion 411 provided in the front end of the fixing bracket 410 to lock a front end of the second lower link 441 to restrict the second lower link 441 in a folded state.

Therefore, the hinge device 400 may be normally maintained in the folded state such that the first lower link 431 is locked to the fixing bracket 410 by the constraining member 470 and the second lower link 441 is also locked by the constraining protrusion 411 of the fixing bracket 410. In this state, the hood 10 may be rotated and then opened or closed since the hood bracket 420 is rotatably coupled to the first upper link 432 and the second upper link 442.

When the collision of the vehicle occurs, the actuator 460 may release the constraint by the constraining member 470 and the constraining protrusion 411 by raising the second lower link 441, as illustrated in FIG. 11, and at the same time, the actuator 460 may allow the rear link portion 430 and the front link portion 440 to be unfolded by raising the second lower link 441 to the upper side, as illustrated in FIG. 12.

Referring to FIG. 13, the constraining member 470 may include a folding limitation protrusion 473 configured to limit a folding in a state in which the rear link portion 430 is unfolded, and the first upper link 432 may include a locking protrusion 436 locked to the folding limitation protrusion 473 in the state in which the rear link portion 430 is unfolded.

After the hinge device 400 is unfolded, the locking protrusion 436 of the first upper link 432 may be locked to the folding limitation protrusion 473 of the constraining member 470 and thus the hinge device 400 may maintain the state in which the hinge device 400 is unfolded (i.e. a raised state), as illustrated in FIG. 13. Therefore, it may be possible to prevent a pedestrian from secondary hitting on the engine after hitting on the hood 10, when the collision accident occurs.

According to the second embodiment, as for the hinge device 400, a length of the second upper link 442 may be longer than a length of the first upper link 432 so that the hood 10 is moved to the rear upper side by the operation of the hinge device 400, as illustrated in FIG. 12. Further, a distance between the first upper pin 434 and the second upper pin 444 may be shorter than a distance between the first lower pin 433 and the second lower pin 443.

In the active hood apparatus according to the second embodiment, a striker 200 installed in the front end portion of the hood 10 and a hood latch 300 coupled to the striker 200 may be configured the same as the first embodiment. Therefore, when the hood 10 is raised to the rear upper side by the operation of the hinge device 400 in the rear end portion of the hood 10, the front end portion of the hood 10 may be raised to the rear upper side.

As mentioned above, as for the active hood apparatus for vehicle according to the second embodiment, when the vehicle collides with a pedestrian, the front end and the rear end of the hood 10 may be raised from the engine compartment to secure a buffer space so as to soften the impact. In addition, since the impact is softened by an operation in which the entire of the hood 10 is moved to the rear side, the reduction effect of the impact applied to the pedestrian may be improved.

As is apparent from the above description, according to the proposed active hood apparatus, when colliding with a pedestrian, the hood may be raised from the engine compartment to secure a butter space and thereby softening an impact, as well as the impact may be reduced by the operation in which the entire hood is moved to the rear upper side, and thus it may be possible to improve the reduction effect of the impact applied to the pedestrian.

In addition, the active hood apparatus may be provided with the striker having the upper locking portion and the lower locking portion, and thus when the hood is raised to the rear upper side by the operation of the hinge device, the front end portion of the hood may be also raised to the rear upper side. That is, it may be possible to raise the front end of the hood 10 to the rear upper side without installing an additional actuator in the front end portion of the hood In addition, the active hood apparatus may prevent a pedestrian from secondary hitting on the engine after hitting on the hood 10 since the hinge device maintains the raised state by preventing from being folded after being unfolded to the rear upper side.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An active hood apparatus for a vehicle, the active hood apparatus comprising:
 a hood configured to cover an engine compartment of vehicle; and
 a hinge device configured to rotatably connect a rear end portion of the hood to a vehicle body, wherein the hinge device comprises:
  a fixing bracket to be fixed to the vehicle body;
  a rotation bracket provided such that a rear end of the rotation bracket is rotatably connected to a rear end portion of the fixing bracket;
  a hood bracket fixed to an inner surface of the hood and fixed to the rotation bracket by a first breaking pin;
  a connecting link provided such that opposite ends of the connecting link are rotatably connected to a rear end portion of the hood bracket and a middle portion of the rotation bracket, respectively;
  an actuator configured to, in response to a collision, push up the connecting link with a force that is sufficient to break the first breaking pin and to raise the hood bracket to a rear upper side by separating the hood bracket from the rotation bracket; and
  a second breaking pin configured to fix the connecting link to the rotation bracket, wherein the active hood apparatus is configured so that when a collision occurs, the actuator pushes up the connecting link with a force that is sufficient to break the first breaking pin and the second breaking pin.

2. The active hood apparatus of claim 1, wherein the hinge device further comprises a descent limitation protrusion provided in the fixing bracket and a locking member installed in the rotation bracket and configured to limit the descent of the rotation bracket by being locked to the descent limitation protrusion when the hood bracket is separated from the rotation bracket and the rotation bracket is raised.

3. The active hood apparatus of claim 2, wherein the locking member is rotatably installed in the rotation bracket, wherein a rotation of the locking member is limited by being locked to the hood bracket or the connecting link before the hood bracket is raised, and after the hood bracket is raised, the locking member can be rotated by an elastic member and then locked to the descent limitation protrusion.

4. The active hood apparatus of claim 1, further comprising a striker installed in a front end portion of the hood, wherein the striker is configured to bond with a hood latch installed in the vehicle body.

5. The active hood apparatus of claim 4, wherein the striker comprises an upper locking portion normally coupled to the hood latch and a lower locking portion disposed in a front side of the upper locking portion in a state of being continuously connected to the upper locking portion, placed in a position lower height than the upper locking portion, and configured to raise the front end portion of the hood by being coupled to the hood latch as the hood is moved to the rear upper side.

6. An active hood apparatus for a vehicle, the active hood apparatus comprising:
 a hood configured to cover an engine compartment of the vehicle; and
 a hinge device configured to rotatably connect a rear end portion of the hood to a vehicle body, wherein the hinge device comprises:
  a fixing bracket to be fixed to the vehicle body;
  a hood bracket fixed to an inner surface of the hood;
  a rear link portion provided such that opposite ends of the rear link portion are rotatably connected to the fixing bracket and the hood bracket, respectively, the rear link portion being configured to be maintained in a folded state since a joint connecting portion provided in the middle of the rear link portion is normally moved to a front side;
  a front link portion installed in a more front side than the rear link portion, the front link portion provided such that opposite ends of the front link portion are rotatably connected to the fixing bracket and the hood bracket, respectively, and configured to be maintained in a folded state since a joint connecting portion provided in the middle of the front link portion is normally moved to the front side;
  a middle link portion provided such that opposite ends of the middle link portion are rotatably connected to the joint connecting portion of the rear link portion and the joint connecting portion of the front link portion, respectively; and an actuator configured to raise the hood bracket to a rear upper side by allowing the rear link portion and the front link portion to be unfolded by pushing up the lower side the front link portion in response to a collision.

7. The active hood apparatus of claim 6, wherein the rear link portion comprises a first lower link rotatably connected to the fixing bracket by a first lower pin, a first upper link rotatably connected to the hood bracket by a first upper pin, and a first middle pin configured to connect the first lower link to the first upper link to be foldable; and
wherein the front link portion comprises a second lower link rotatably connected to the fixing bracket by a second lower pin, a second upper link rotatably connected to the hood bracket by a second upper pin, and a second middle pin configured to connect the second lower link to the second upper link to be foldable.

8. The active hood apparatus of claim 7, wherein the hinge device further comprises:
a constraining member rotatably installed in the first lower link to restrict the first lower link in a folded state, and provided with a constraining groove opened in one end portion in a circumferential direction;
a constraining pin installed in the fixing bracket and normally inserted into the constraining groove of the constraining member to maintain binding of the constraining member; and
a constraining protrusion provided in the fixing bracket to lock a front end of the second lower link to normally restrict the second lower link in a folded state.

9. The active hood apparatus of claim 8, wherein when a collision occurs, the actuator is configured to raise the second lower link to allow constraint by the constraining member and the constraining protrusion to be released and simultaneously to allow the front link portion and the rear link portion to be unfolded.

10. The active hood apparatus of claim 9, wherein the constraining member comprises a folding limitation protrusion configured to limit a folding in a state in which the rear link portion is unfolded, and wherein the first upper link comprises a locking protrusion locked to the folding limitation protrusion in the state in which the rear link portion is unfolded.

11. The active hood apparatus of claim 7, wherein a length of the second upper link is longer than a length of the first upper link.

12. The active hood apparatus of claim 11, wherein a distance between the first upper pin and the second upper pin is shorter than a distance between the first lower pin and the second lower pin.

13. The active hood apparatus of claim 6, further comprising:
a striker installed in the front end portion of the hood; and
a hood latch configured to be installed in the vehicle body for bonding of the striker.

14. The active hood apparatus of claim 13, wherein the striker comprises an upper locking portion coupled to the hood latch and a lower locking portion disposed in the front side of the upper locking portion in a state of being continuously connected to the upper locking portion, placed in a position lower height than the upper locking portion, and configured to raise the front end portion of the hood by being coupled to the hood latch as the hood is moved to the rear upper side.

15. A hinge device configured to rotatably connect a rear end portion of a hood to a vehicle body, the hinge device comprising:
a fixing bracket configured to be fixed to the vehicle body;
a hood bracket configured to be fixed to an inner surface of the hood;
a rear link portion provided such that opposite ends of the rear link portion are rotatably connected to the fixing bracket and the hood bracket, respectively, the rear link portion being configured to be maintained in a folded state since a joint connecting portion provided in the middle of the rear link portion is normally moved to a front side;
a front link portion installed in a more front side than the rear link portion, the front link portion provided such that opposite ends of the front link portion are rotatably connected to the fixing bracket and the hood bracket, respectively, and configured to be maintained in a folded state since a joint connecting portion provided in the middle of the front link portion is normally moved to the front side;
a middle link portion provided such that opposite ends of the middle link portion are rotatably connected to the joint connecting portion of the rear link portion and the joint connecting portion of the front link portion, respectively; and
an actuator configured to raise the hood bracket to a rear upper side by allowing the rear link portion and the front link portion to be unfolded by pushing up the lower side the front link portion.

16. The hinge device of claim 15, wherein the rear link portion comprises a first lower link rotatably connected to the fixing bracket by a first lower pin, a first upper link rotatably connected to the hood bracket by a first upper pin, and a first middle pin configured to connect the first lower link to the first upper link to be foldable; and
wherein the front link portion comprises a second lower link rotatably connected to the fixing bracket by a second lower pin, a second upper link rotatably connected to the hood bracket by a second upper pin, and a second middle pin configured to connect the second lower link to the second upper link to be foldable.

17. The hinge device of claim 16, wherein the hinge device further comprises:
a constraining member rotatably installed in the first lower link to restrict the first lower link in a folded state, and provided with a constraining groove opened in one end portion in a circumferential direction;
a constraining pin installed in the fixing bracket and normally inserted into the constraining groove of the constraining member to maintain binding of the constraining member; and
a constraining protrusion provided in the fixing bracket to lock a front end of the second lower link to normally restrict the second lower link in a folded state.

18. The hinge device of claim 16, wherein a length of the second upper link is longer than a length of the first upper link and wherein a distance between the first upper pin and the second upper pin is shorter than a distance between the first lower pin and the second lower pin.

* * * * *